(12) United States Patent
Veshchikov

(10) Patent No.: US 12,499,226 B2
(45) Date of Patent: Dec. 16, 2025

(54) CIRCUIT AND METHOD FOR PROTECTING AN APPLICATION AGAINST A SIDE CHANNEL ATTACK

(71) Applicant: NXP B.V., Eindhoven (NL)

(72) Inventor: Nikita Veshchikov, Brussels (BE)

(73) Assignee: NXP B.V., Eindhoven (NL)

( * ) Notice: Subject to any disclaimer, the term of this patent is extended or adjusted under 35 U.S.C. 154(b) by 264 days.

(21) Appl. No.: 18/174,782

(22) Filed: Feb. 27, 2023

(65) Prior Publication Data

US 2024/0289451 A1    Aug. 29, 2024

(51) Int. Cl.
  *G06F 21/55* (2013.01)
  *G06F 21/54* (2013.01)
  *G06F 21/57* (2013.01)

(52) U.S. Cl.
  CPC ............ *G06F 21/556* (2013.01); *G06F 21/54* (2013.01); *G06F 21/577* (2013.01)

(58) Field of Classification Search
  CPC ...... G06F 21/556; G06F 21/54; G06F 21/577; G06F 2221/033
  See application file for complete search history.

(56) References Cited

U.S. PATENT DOCUMENTS

| | | | |
|---|---|---|---|
| 6,260,157 B1 | 7/2001 | Schurecht et al. | |
| 9,392,017 B2 | 7/2016 | Cui et al. | |
| 9,658,867 B2 | 5/2017 | Sreedhar et al. | |
| 10,839,052 B2 | 11/2020 | Williams et al. | |
| 10,958,414 B2 | 3/2021 | Stark | |
| 2011/0107070 A1 | 5/2011 | Barbulescu et al. | |
| 2021/0141907 A1 | 5/2021 | Kim et al. | |
| 2023/0385410 A1* | 11/2023 | Agarwal | G06F 21/79 |
| 2024/0248709 A1* | 7/2024 | Deivasigamani | G06F 8/66 |

FOREIGN PATENT DOCUMENTS

| | | |
|---|---|---|
| CN | 210760724 U | 6/2020 |
| CN | 112447438 A | 3/2021 |
| WO | WO-2020001777 A1 * | 1/2020 |

OTHER PUBLICATIONS

He, Yi et al.; "RapidPatch: Firmware Hotpatching for Real-Time Embedded Devices"; 31st USENIX Security '22 Symposium; Aug. 10-12, 2022, Boston, Massachusetts.

* cited by examiner

*Primary Examiner* — Esther B. Henderson

(57) ABSTRACT

A method is provided for protecting a device against a side channel attack. In the method a portion of code in a program stored in read only memory (ROM) of an integrated circuit is determined to be vulnerable to a side channel attack. A patch memory is provided, separate from the ROM, for storing one or more instructions configured to transfer execution of the portion of code to a side channel protection function stored in the ROM. Execution of the program is transferred to the side channel protection function stored in the ROM. The side channel protection function in the ROM is configured to modify execution of the portion of code to protect against a possible side channel attack. After the side channel function is applied, normal program execution resumes. In another embodiment, an integrated circuit is provided that performs the method.

20 Claims, 5 Drawing Sheets

CIRCUIT AND METHOD FOR PROTECTING AN APPLICATION AGAINST A SIDE CHANNEL ATTACK

BACKGROUND

Field

This disclosure generally relates to electronic circuits, and more particularly, to a circuit and method for protecting an application against a side channel attack.

Related Art

There are many different types of attacks against cryptographic devices and integrated circuits in general. One of class of attack is a side channel attack. Types of side channel attacks include electromagnetic, optical, power, timing attacks, etc. Fault injection attacks are a type of side channel attack where the attacker actively triggers a fault in the device. Faults may be triggered electrically, by modulating the power supply, using radiation or other means. The goal of a side channel attack is to gain information that can be indirectly leaked by the application. This information is then used for malicious purposes, such as guessing a cryptographic key or a password of a user. For example, in the timing attack, the attacker supplies various inputs to the application, times the processing and statistically analyzes this information, until the attacker guesses the valid input, such as a password.

There are various defenses used to protect against side channel attacks. As an example, a commonly used defense against a timing attack involves identifying the security vulnerable functions of code in an application and then making the number of computations needed for processing a request independent of an input to the function. For embedded applications, firmware may be programmed into a read only memory (ROM) of an integrated circuit (IC). When an application is developed, it may be difficult to detect all potential information leakages that can be captured using a timing attack. It is possible that unprotected vulnerable portion of code still exists in a product after the product's release.

Therefore, what is needed is a method and integrated circuit for protecting a program stored in ROM from a side channel attack, such as a timing attack, even when an unprotected vulnerable portion of code is discovered after the ROM is programmed.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
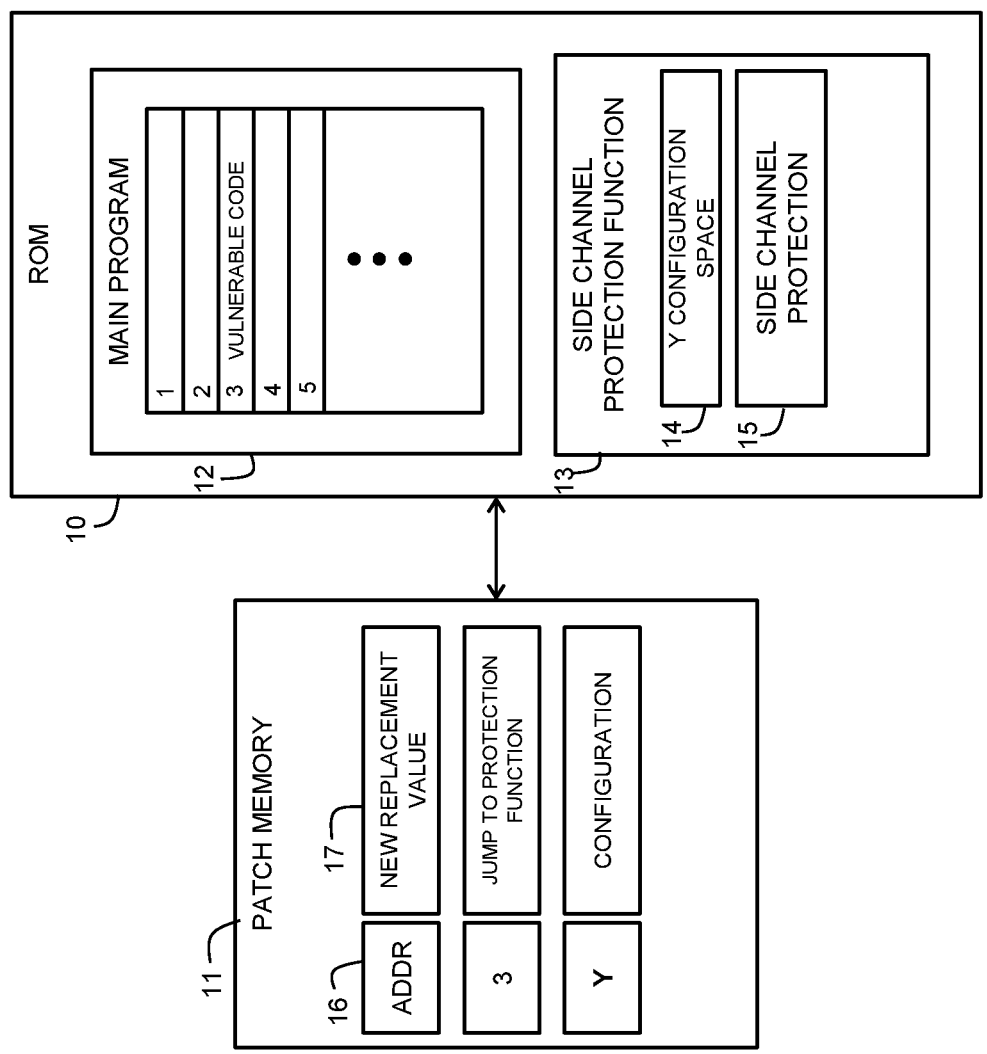
FIG. 1 illustrates a diagram for a program flow between a ROM and a patch memory after patching with a side channel protection function against a side channel attack.

Generally, there is provided, a method and integrated circuit for adding side channel attack protection for a vulnerable function in ROM using a patch memory. In one example useful for describing the method, the side channel attack protection is implemented as a defense against timing attacks directed to a portion of a main program in ROM for an embedded system. In other embodiments, the type of side channel attack may be different. The method is intended for vulnerable portions of code that are identified after the final version of the program is programmed into the ROM. During program development, a delay function is included in the ROM but the delay function is not part of the main program and there are no calls to the delay function by the main program. When an unprotected portion of code is detected, the patch memory, which may be a relatively small non-volatile memory, is programmed to include an address of the vulnerable code, a call for the delay function in ROM, and a return code for resuming the main program in ROM after the delay function is complete. The delay function includes a configuration that includes parameters such as the amount of wait time for the delay and a return address to the main program. The delay function is computed so that the execution time for the vulnerable portion of code is relatively constant no matter when the execution is complete. After computation of the delay is complete, program execution returns to the address in the main program as stored in the patch memory. In another embodiment, multiple side channel functions can be stored for defenses against different types of side channel attacks. The method provides a relatively easy way to provide side channel attack protection when the vulnerable code was not identified during development.

In accordance with an embodiment, there is provided, a method including: determining that a portion of code in a program stored in read only memory (ROM) of an integrated circuit is vulnerable to a side channel attack; adding one or more instructions to a patch memory, the patch memory being separate from the ROM, the one or more instructions configured to transfer execution of the portion of code to a side channel protection function stored in the ROM, wherein the side channel protection function is not part of the program and is not called by the program; transferring execution from the program to the side channel protection function stored in the ROM via the patch memory, wherein the side channel protection function in the ROM is configured to modify execution of the portion of code to protect against the side channel attack; and returning from the side channel protection function to normal program execution. The side channel attack may be a timing attack. The program stored in the ROM may be firmware for an embedded application. The side channel protection function may be a delay function configured to extend an execution time of the portion of code to be longer than an execution time without the delay function. Execution of the portion of code may be variable contingent upon a condition being met, and when the condition is met, execution of the program proceeds past the portion of code. The side channel protection function may include a delay function, the delay function being configured to make an execution time of the portion of code independent of a number of instructions needed to be executed for the condition to be met. The portion of code may be an instruction loop including a sequence of instructions that are repeated until the condition is met, and the delay function computes a delay time to be added to the instruction loop as a function of a maximum loop counter value minus a current loop counter value multiplied by a loop size in clock cycles, wherein the maximum loop counter value is a maximum number of times the loop can be executed, and the current loop counter value is the number of times the instruction is executed before early exit. The delay time is implemented as a plurality of instructions that simulates performing computations of the portion of code. Configuration parameters for the side channel protection function may be stored in a register file of the integrated circuit. Program execution may be transferred to the side channel protection function via the patch memory each time the portion of code is called for execution.

In another embodiment, there is provided, an integrated circuit including: a read only memory (ROM) configured to store a program, wherein a portion of the program has been determined to be vulnerable to a side channel attack; and a patch memory associated with the ROM for storing one of more instructions configured to transfer execution of the program to a side channel protection function stored in the ROM, wherein the side channel protection function is configured to modify execution of the portion of firmware vulnerable to the side channel attack. The integrated circuit may further include a configuration storage space in the ROM for storing parameters for the side channel protection function. The side channel attack may be a timing attack. The side channel protection function includes a delay function configured to extend an execution time of the portion of code of the program to be longer than an execution time without the delay function. The portion of code may be an instruction loop including a sequence of instructions that are repeated until a condition is met, and the side channel protection function includes a delay function that computes a delay time to be added to the instruction loop as a function of a maximum loop counter value minus a current loop counter value multiplied by a loop size in clock cycles, wherein the maximum loop counter value is a maximum number of times the loop can be executed, and the current loop counter value is the number of times the instruction is executed before early exit . . . . The maximum loop counter value, the current loop counter value, and the loop size may be stored in a register file. The side channel protection function may modify execution of the portion of firmware by adding a delay time to extend execution of the portion of firmware, the delay time being implemented as a plurality of instructions that simulates performing computations of the portion of code.

In yet another embodiment, there is provided, a method including: determining that a portion of code in a program stored in read only memory (ROM) of an integrated circuit is vulnerable to a timing attack; adding one or more instructions to a patch memory to transfer execution of the portion of code to a delay function stored in the ROM via the patch memory, wherein the delay function in the ROM is not part of the program and is not called by the program; transferring execution of the program to the delay function stored in the ROM wherein the delay function in the ROM is configured to delay execution completion of the portion of code by a delay time; and after executing the delay function, returning to normal execution of the program. Execution of the portion of code may be variable contingent upon a condition being met, and when the condition is met, execution of the program proceeds past the portion of code. The delay function may be configured to make an execution time of the portion of code independent of a number of instructions needed to be executed for the condition to be met.

In a side channel attack such as a timing attack a program is provided with different inputs and the execution time of the program is observed for leaked information about the state of, e.g., an embedded device. Such observations can help to retrieve information such as secret data that was used by the program. For example, an attacker may observe the execution time of an encryption algorithm and infer the value of a secret encryption key.

There are many scenarios in which information leakage of this type occurs. One of the most common is an if-then-else statement in a program in which the condition depends on the internal (secret) state and the execution time of the "if" branch is different from the "else" branch. Another common scenario is an "early exit" from a program loop. An early exit from a program loop occurs when a specific condition is met or a value is found in a data structure causing the program to exit the loop as soon as it happens. Most of the time it does not lead to the information leakage. However, sometimes the condition for early exit can be influenced by the secret internal state of the system and then it can lead to the information leakage observable by measuring the execution time.

When a bug, or error, is found in a piece of software, developers usually try to fix it, especially if it is related to a security issue. When the code that needs to have a bug fixed runs inside of an embedded system the bug fix might be difficult to implement because the amount of memory in an embedded system is typically limited and the memory is a read only memory (ROM) that cannot be overwritten.

In some cases integrated circuit manufacturers may implement a patch memory that allows small patches to the ROM for bug fixes. Typically such patch memories allow the replacement of several dozens of data or code words (usually one word is 32 bits), thus limiting the size and number of patches for bug fixes for the life of the integrated circuit. One example of a patch memory for a ROM is the ARM Cortex M3 and M4 processors that include a Flash Patch and Breakpoint Unit (FPB) for implementing breakpoints and patching code. Other manufacturers may provide a different patch memory for patching code.

It is nearly impossible to catch all bugs or errors in a program. Similarly, it is also difficult to detect all potential information leakages that can be captured by a side channel attack. The method disclosed herein uses the patch memory to add a side channel protection function to protect vulnerable code that was missed during program development. The method uses a minimal amount of memory in the ROM and the patch memory to add the side channel protection function.

FIG. 1 illustrates a diagram for a program flow between ROM 10 and patch memory 11 after patching with a side channel protection function. ROM 10 and patch memory 11 may be implemented as part of an integrated circuit. The integrated circuit may be used in an embedded application. ROM 10 stores a main program 12 having a plurality of instructions. In one embodiment, ROM 10 may be part of an integrated circuit, and main program 12 may be firmware for controlling the embedded application. Main program 12 may include portions of code that form loops. As an example, address "3" in main program 12 represents one or more instructions that form a loop that includes an if-thenelse statement that has been determined to be vulnerable to a side channel attack, but was not detected during program development.

Side channel protection function 13 is not initially part of main program 12 and is not used by main program 12. That is, there are no calls for side channel protection function 13 in main program 12. Side channel protection function 13 includes configuration space 14, and side channel protection 15. When the vulnerable code is encountered, a patching mechanism such as FPB, diverts execution to side channel protection function 13 using an address of the vulnerable code stored in address column 16 of patch memory 11. Note the organization of patch memory 11 is for illustration purposes and may be different in other embodiments. Patch memory 11 includes instructions for setting up the parameters for the side channel protection function 13 implementing side channel protection. In one embodiment, patch memory 11 includes an address of the vulnerable code at address "3" of main program 12 so that execution is diverted to side channel protection function 13 to provide protection against a side channel attack to vulnerable code at address 3 shown in address column 16. In patch memory 11, a return address is computed in advance and is inserted in a configuration space of replacement value column 17 in patch memory 11. The return address is used to return to normal execution of main program 12. Empty configuration space 14 in side channel protection function 13 cannot be reprogrammed after the initial programming because it is in ROM, but the address can serve as a marker in patch memory 11 for the configuration information. The empty configuration space 14 at address "Y" is connected to patch memory 11 by address "Y". Returning to main program 12 also sets the return code, i.e., the status or the result of the computation or verification made by the vulnerable code. Patch memory 11 includes the parameters such as, e.g., the location of the code that should be used for the return from the vulnerable function. Other auxiliary information can be passed to side channel protection function 13 using configuration space 14 in patch memory 11. After side channel protection function 13 has finished, execution will return to the main program 12 via the return address stored in patch memory 11. Main program 12 may use a return status from the vulnerable portion of code to decide what to do next. The return status is often provided in a register or in a specific memory location (not shown).

As an example, side channel protection function 13 can protect against, e.g., a power analysis attack. Side channel protection function 13 can be a function that enables a noise generator. For example, a function is discovered in main program 12 that is vulnerable to a side channel attack. Therefore, every time the side channel protection function 13 executes, some noise generation is provided as code modification to increase the amount of noise and make the side channel attack more difficult to execute. The noise generation may be implemented in ROM 10 and may be enabled to run in parallel with the vulnerable portion of code. For example, the noise generator function can run in an interleaved manner with the protected portion of code. For example, for protected functions A and noise generator B the execution would look like "ABABABABABAB" with A and B being random in length). Note, that this can also protect against some fault injection attacks. In addition, the interleaved execution can run fault injection detection in software. Side channel protection function 13 would include the correct times to enable and disable the noise generator to mitigate the attack. Alternatively, the noise generator may be run by a separate processor core, if another processor core is available in the integrated circuit.

Figure 2:
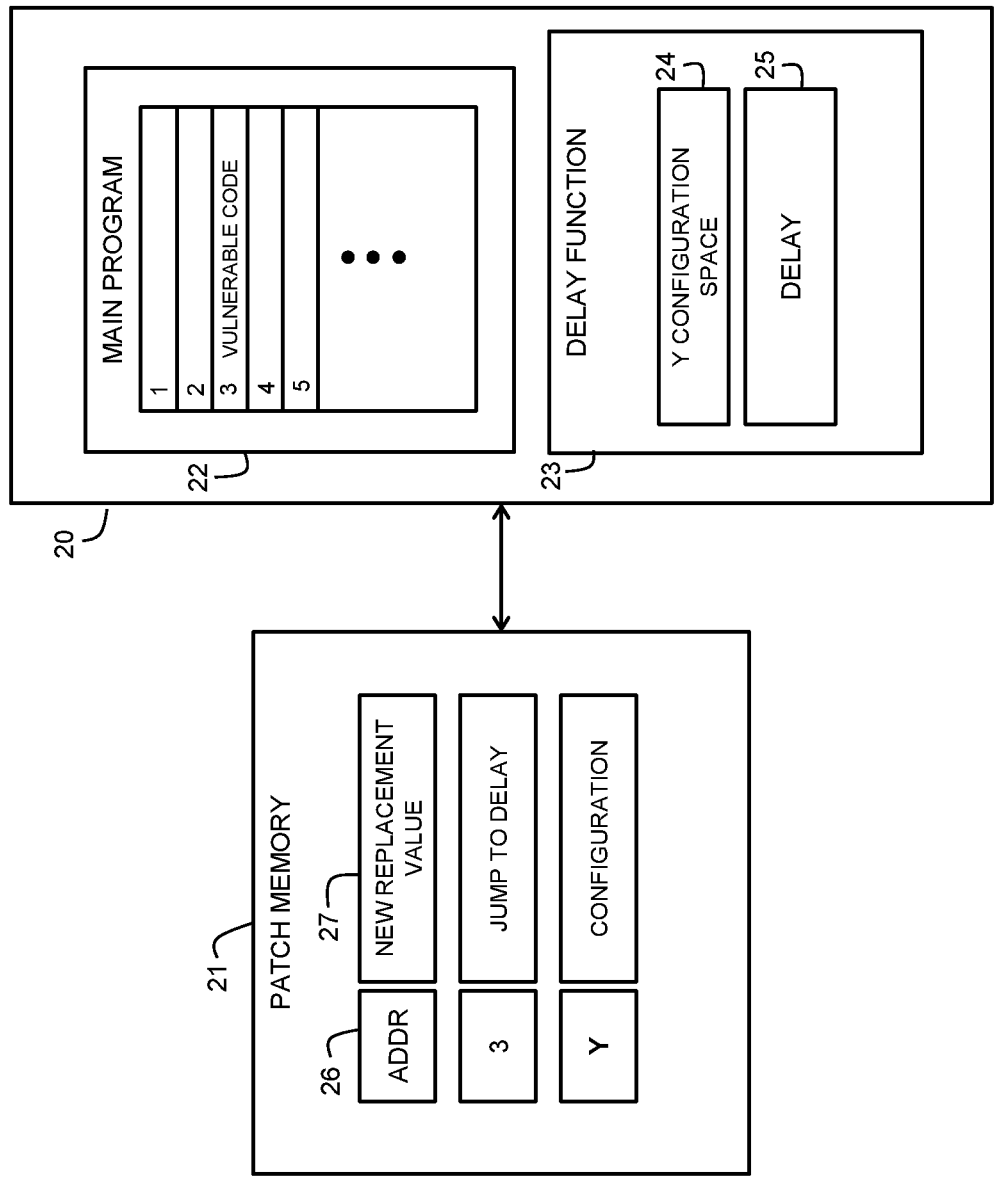
FIG. 2 illustrates a diagram for a program flow between a ROM and a patch memory after patching with a delay function against a timing attack.

FIG. 2 illustrates a diagram for a program flow between ROM 20 and patch memory 21 after patching with delay function 23 against a timing attack. A timing attack is a specific example of a side channel attack. ROM 20 stores a main program 22 having a plurality of instructions. In one embodiment, ROM 20 may be part of an integrated circuit, and main program 22 may be firmware for controlling an embedded device. Main program 22 may include portions of code that form loops. As an example, address "3" in main program 22 represents one or more instructions that form a loop that includes an if-then-else statement that has been determined to be vulnerable to a timing attack, but was not detected during program development. According to an embodiment, when vulnerable code is encountered, a patching mechanism such as FPB, diverts execution to delay function 23 using a patch in patch memory 21. Delay function 23 is not initially used by main program 20. Delay function 23 is not immediately used by any code that runs in the device. Delay function 23 is provided for patching vulnerable code detected after the ROM main program 22 is developed. Delay function 23 includes configuration space 24 and delay function 25 for modifying execution time of the vulnerable code portion. Empty configuration space 24 in delay function 13 cannot be programmed after the initial programming because it is in ROM, but the address of configuration space 24 can serve as a marker in patch memory 21 for the configuration information. The stored configuration information may include an address in ROM for return to normal program execution of main program 22. The return to normal execution may also include returning to main program 20 with a return status computed by the vulnerable portion of code that is being protected.

Patch memory 21 includes instructions for setting up the parameters for the delay function 23 for timing attack protection. In one embodiment, patch memory 21 includes an address of the vulnerable code at address "3" of main program 22 so that execution is diverted to side channel protection function 13 to provide protection against a timing attack to vulnerable code at address 3. In patch memory 21, a return address is computed in advance and is inserted in a configuration space in patch memory 21 as part of the patch that includes an address used to return to normal execution of main program 22. Empty configuration space 24 in delay function 23 cannot be written to because it is in ROM, but the address can serve as a marker in patch memory 21 for the configuration information. The empty configuration space 24 at address "Y" is connected to patch memory 21 by an address "Y". Returning to main program 22 also sets the return code, i.e., the status or the result of the computation or verification made by the vulnerable code. Patch memory 21 includes parameters such as, e.g., the location of the code that should be used for the return from the vulnerable portion of code. Other auxiliary information can be passed to delay function 23 using the configuration space in patch memory 21. After delay function 23 has finished, execution will return to the main program 22 via the return address. Main program 22 will typically use the return status from the vulnerable portion of code to decide what to do next. The return status may be provided in a register or in a specific memory location (not shown).

Still referring to FIG. 2, sometimes a vulnerable portion of code starts at a midpoint of a function. In this case, instead of returning to the main program at the end of the portion of code, a return instruction in the configuration column 27 of patch memory 21 has to return back to the middle of the vulnerable code "3", and must restore registers and structures that it modified to perform the delay.

As an example, line 3 in main program 22 represents one or more instructions that form a loop that has been determined to be vulnerable to a timing attack but was not detected during program development. According to an embodiment, when the vulnerable code is encountered, a patching mechanism such as FPB, diverts execution to patch memory 21. The patch includes the address "3" of the vulnerable code in the address 26 column of patch memory 21. A return code to main program 22 is computed in advance and execution is directed to perform the delay function 25. Delay function 25 is executed as part of the execution of the vulnerable portion of code in main program 22. After execution of the delay function 25 is complete, the state is restored and execution proceeds to the remainder of the vulnerable code.

Note that in some embodiments, use of the delay function may not make execution of the code constant time. However, it can make the variability of execution time so small that it would be difficult or impossible to measure with the available time-measurement mechanisms.

If the use of the delay function succeeds in making the timing attack difficult, the attacker may still try to detect the delay function using power analysis and thus deduce the execution time of the original vulnerable code. The ease and success of power analysis depends on the type of the device but also on the way the waiting time is implemented in the delay function. The simple wait without doing anything is the easiest type of wait to detect using power analysis. The active wait might be distinguishable using power analysis but simulated wait should be the most difficult to detect and distinguish from the actual execution.

Several configuration parameters are required for delay function 23 to work properly. These parameters can be passed to delay function 23 in several different ways. In one embodiment, the parameters may be stored in registers (not shown) of the IC. Using registers may be faster but the registers have to be set up and a bigger patch 28 may be required to use the registers for delay function 23. However, a return status, when a return code is computed, as well as the return address to the main code may already be in specific standard registers of the IC and eliminating the need to pass them in another way to delay function 23. In another embodiment, the parameters may be in a designated memory location that is accessible from any potentially vulnerable function as well as from the delay function. Some of the configuration parameters can be included in delay function 23 itself. However, including the configuration parameters in delay function 23 may require too much memory space in patch memory 21. Also, the different configuration parameters may be split up and stored in different locations.

In one embodiment, delay function 23 adds a delay to a program loop such that the execution time of the program loop is the same, even if there is an early exit from the program loop. One of the simplest ways to tell the delay function how long to delay is to provide one delay parameter that is one of either the number of clock cycles or amount of time in milliseconds to spend delaying. However, this delay amount has to be computed on the fly each time it is needed. Another way is to provide 3 separate parameters to the delay function that are already available or can be computed one time in advance. A first parameter is the current loop counter C which is the number of times that a program loop was executed before an early exit (that results in a timing difference between several executions). A second parameter is a max loop counter M which is the maximum number of times that a program loop can be executed. A third parameter is a loop size S which gives the number of clock cycles of a single loop execution. The loop size can be computed by a programmer and set to a specific memory location, that is, this number would not change from one execution to another for one given vulnerable portion of code. A delay time T that the delay function will have to "wait" can be computed by delay function 23 itself and is given by T=(M−C)*S. Note, that a time required for delay function 23 to get all the parameters for the configuration may be subtracted from delay time T to reduce the wait time.

The waiting time of the delay function can be implemented in several different ways. For example, in one embodiment, delay function 23 may simply wait. That is, the function waits a specific number of clock cycles or time in, e.g., milliseconds and does nothing during the wait time. This is a simple solution in terms of code size and complexity. In another embodiment, the delay function may perform an "active" wait, where the delay function will execute one or more dummy functions to simulate active computations. The dummy functions may be based on a cryptographic function such as an encryption or a hash function with some random inputs. In another embodiment, delay function 23 may perform a simulated wait by executing the same code as the vulnerable function to simulate executing the same program loop. In this case delay function 23 needs the addresses of the beginning and end (or beginning and length) of the vulnerable loop that was exited too early and caused the information leakage. Note that in this case, to compute the delay time T, delay function 23 does not require the loop size S, it just the needs the current loop counter C and the max loop counter M.

Figure 3:
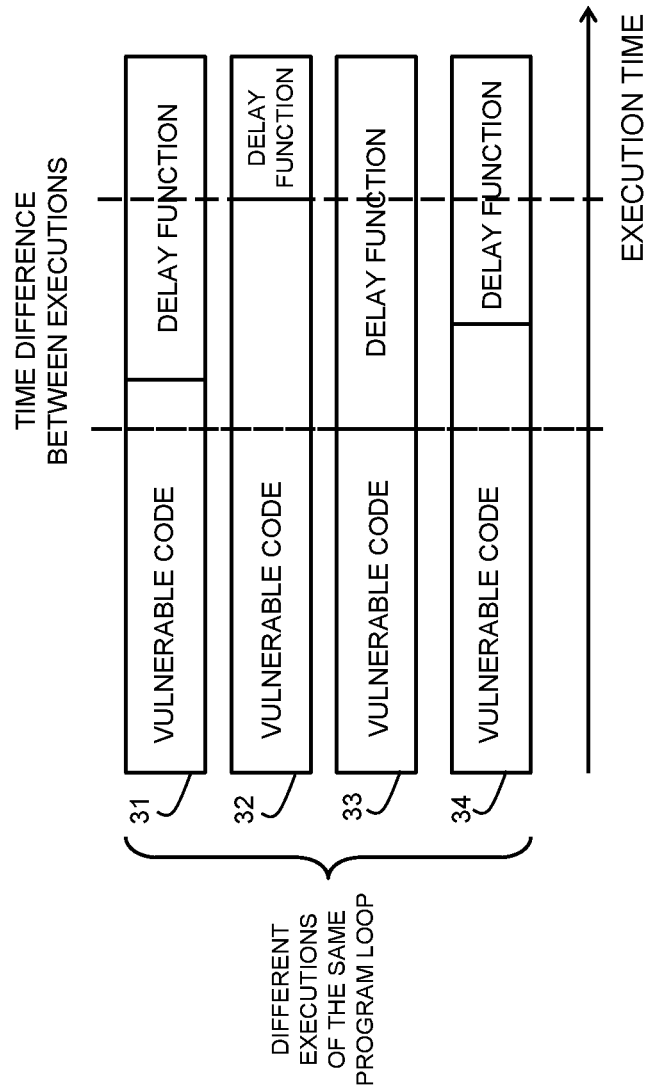
FIG. 3 illustrates a timing diagram for several different executions of a vulnerable code with a delay computed using the delay function of FIG. 2.

FIG. 3 illustrates a timing diagram for several different executions of vulnerable code with a delay computed using a delay function as computed in FIG. 2. Vulnerable codes 31-34 each includes the same instructions. Each execution takes a different amount of time to compute a result for a different input. For example, execution 33 takes the least amount of time and execution 32 takes the most time. The difference in time may be because a different number of loops is required to determine a result for different inputs. The time difference between the executions leaks information to the attacker. The delay function in the method of FIG. 2 adds a delay time T to each of execution times 31-34 so that the total execution time is the execution time of the vulnerable program loop plus the delay time T. The delay time T is computed so that each of the executions of vulnerable code ends at the same time independent of the actual execution time. Once the delay function patch is applied the total execution time will be constant as shown in FIG. 3. The same delay function can be used to patch several vulnerable portions of code of the ROM using different configurations in the patch memory, limited only by the size of the patch memory.

Figure 4:
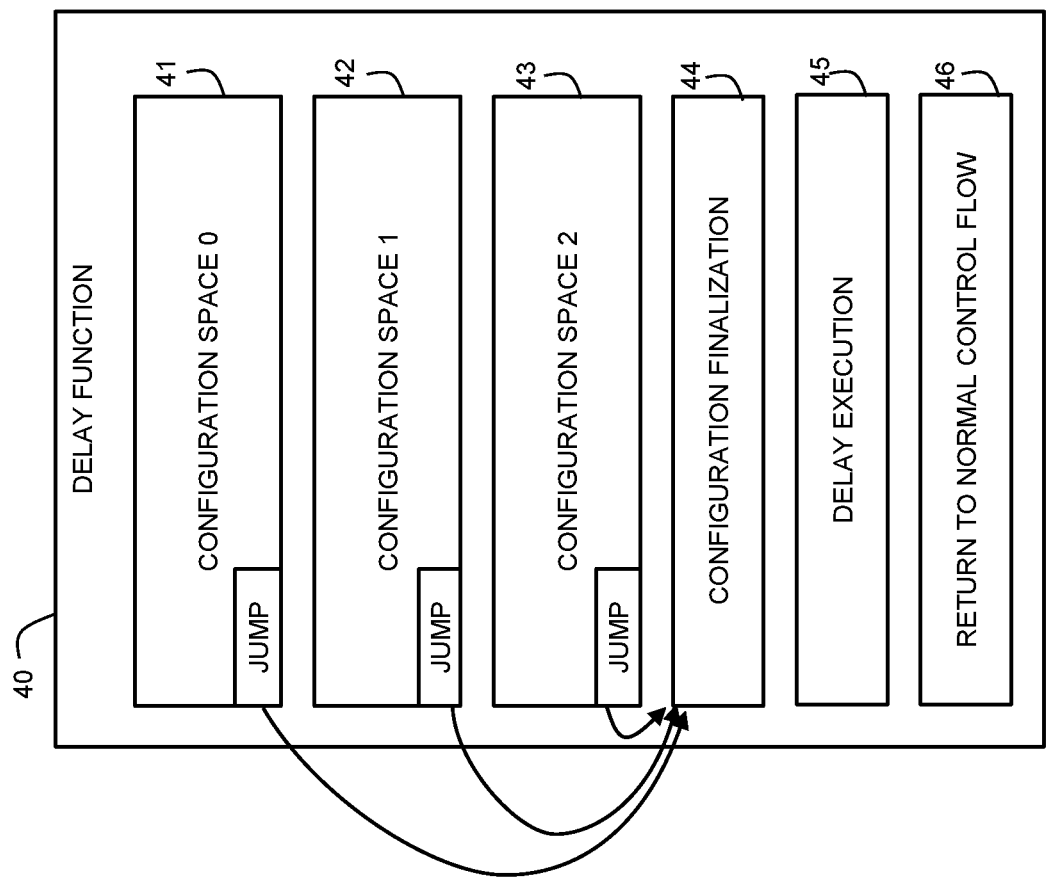
FIG. 4 illustrates a block diagram of a delay function in a ROM with configuration space for storing parameters for a specific patch for use in the embodiment of FIG. 2.

FIG. 4 illustrates a block diagram of delay function 40 that can be used in the ROM of FIG. 1 and FIG. 2. Delay function 40 includes configuration spaces 41-43, where each configuration space can store parameters for a specific patch. In one embodiment, it is possible that loop counter C, max counter M, as well as some other useful information for delay function 40 (e.g., return address to the main code, return value or status) are already in registers of the IC that implements the ROM. The only information that is missing is which register contains what part of this information. Note, that a developer knows this information and it usually does not change from one execution to another. Thus, configuration spaces 41-43 can be filled in by the developer with instructions that specify which registers already contain useful information or can be used to transfer this information into registers or memory that is used by delay function 40. Each configuration space 41-43 can be used to prepare all the parameters for one given vulnerable function that is being patched. At the end of each configuration space there is a jump instruction to configuration finalization 40. Execution of delay function 40 then proceeds as discussed above regarding FIG. 2 with delay execution 45, and return to normal control flow 46.

Figure 5:
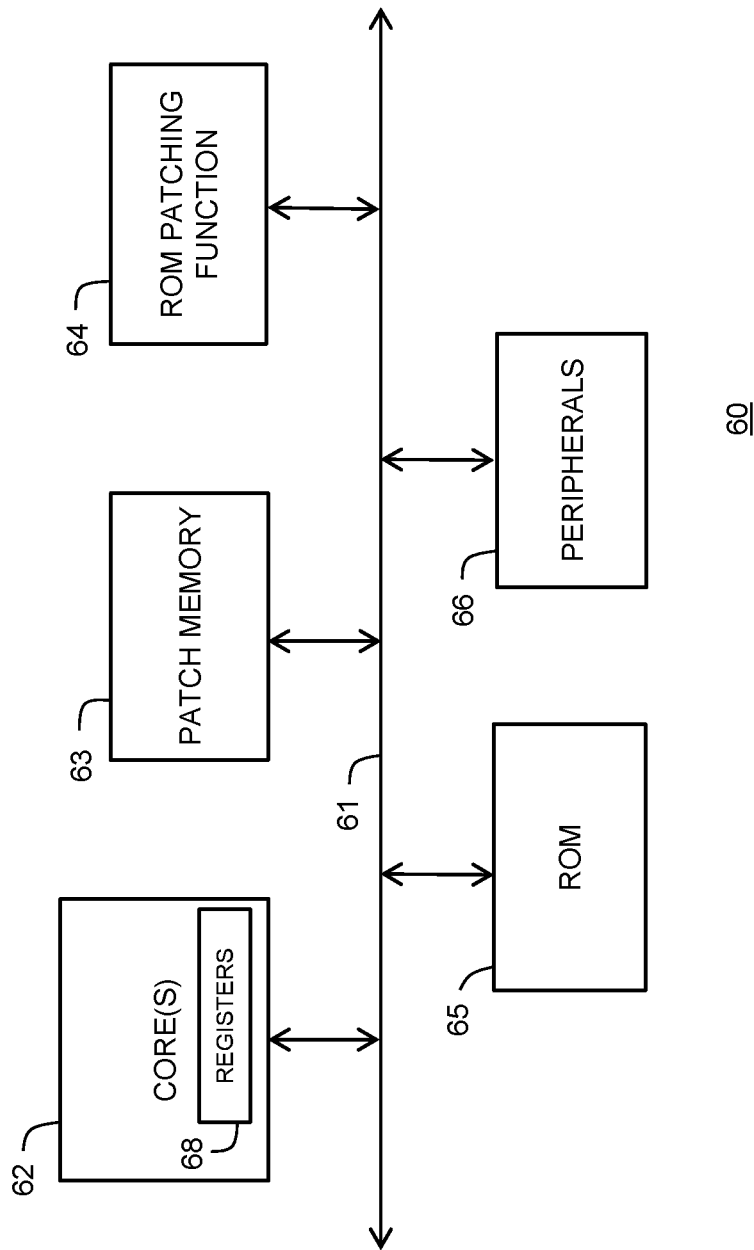
FIG. 5 illustrates a data processing system in accordance with the embodiments of FIG. 1 and FIG. 2.

FIG. 5 illustrates data processing system 60 in accordance with the embodiments of FIG. 1 and FIG. 2. Data processing system 60 may be implemented using one or more integrated circuits and may be used in an implementation of the described embodiments. In one example, data processing system 60 may be a system on a chip (SoC). In another embodiment, data processing system 60 may include multiple integrated circuits (ICs), also known as chips. Data processing system 60 includes data bus or switching network 61 useful for communicating information between circuits of data processing system 60. Connected to bus 61 is one or more processor cores 62, patch memory 63, ROM patching function 64, ROM 65, and peripherals 66. The one or more processor cores 62 may include any hardware device capable of executing instructions stored in ROM 63. For example, processor cores 62 may execute a control application for an embedded application. Processor cores 62 may also execute other applications such as encryption and/or decryption algorithms. Processor cores 62 may be, for example, a microprocessor, field programmable gate array (FPGA), application-specific integrated circuit (ASIC), or similar device. Processor cores 62 may be implemented in a secure hardware element and may be tamper resistant. Processor cores 62 may include a register file 68 that may be used to store parameters for the side channel protection function of FIGS. 1 and 2.

Patch memory 63 may be any kind of memory, such as for example, L1, L2, or L3 cache or system memory. Patch memory 63 may include volatile memory such as static random-access memory (SRAM) or dynamic RAM (DRAM), or may include non-volatile memory such as flash memory, or other volatile or non-volatile memory. Patch memory 63 is provided for use in patching bugs or in applying side channel protection to vulnerable applications detected after product development. Patch memory 63 is typically relatively smaller than the memory it is provided to patch, such as ROM 65. Also, patch memory 63 may be implemented in a secure hardware element or other type of secure storage.

ROM patching function 64 may be any of the side channel protection functions according any of the described embodiments in FIGS. 1-4.

ROM 65 is any type of read only memory that is used to store a program for execution by processor cores 62. In other embodiments, a one-time programable (OTP) memory may be used in place of ROM 65.

Peripherals 66 may be hardware or software or a combination of hardware and software for enabling communication or any other function. Peripherals 66 may include one or more additional processor cores or other types of processors or memory. Peripherals 66 may include user interfaces for coupling to a display, a mouse, a keyboard, or other input/output device. Peripherals 66 may include one or more circuits for enabling communication with other hardware devices. For example, peripherals 66 may include, or be coupled to, a network interface card (NIC) configured to communicate according to the Ethernet protocol. Also, peripherals 66 may implement a TCP/IP stack for communication according to the TCP/IP protocols.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. The terms "circuit" and "circuitry" may refer to hardware, software, or a combination of hardware and software.

Unless stated otherwise, terms such as "first" and "second" are used to arbitrarily distinguish between the elements such terms describe. Thus, these terms are not necessarily intended to indicate temporal or other prioritization of such elements. The term "coupled," as used herein, is not intended to be limited to a direct coupling or a mechanical coupling.

What is claimed is:

1. A method comprising:
    executing a program stored in a read only memory (ROM) of integrated circuit, the program comprising a portion of code that is vulnerable to a side channel attack;
    transferring execution from the program to a side channel protection function, stored in the ROM and separate from and not called by the program, via a patch memory that is separate from the ROM;
    modifying execution of the portion of code, via the side channel protection function, to protect against the side channel attack; and
    returning from the side channel protection function to normal program execution.

2. The method of claim 1, wherein the side channel attack is a timing attack.

3. The method of claim 1, wherein the program stored in the ROM is firmware for an embedded application.

4. The method of claim 1, wherein modifying execution of the portion of code comprises extending an execution time of the portion of code to be longer than an execution time without the extension.

5. The method of claim 1, wherein execution of the portion of code is comprises determining whether a condition has been met, and when the condition is met, execution of the program proceeds past the portion of code.

6. The method of claim 5, wherein modifying the execution of the portion of code comprises computing a delay time that provides that an execution time of the portion of code is independent of a number of instructions needed to be executed for the condition to be met.

7. The method of claim 5, wherein the portion of code is an instruction loop comprising a sequence of instructions that are repeated until the condition is met, and modifying the execution of the portion of code comprises adding a delay time to the instruction loop, wherein the delay time is a maximum loop counter value minus a current loop counter value multiplied by a loop size in clock cycles, wherein the maximum loop counter value is a maximum number of times the loop can be executed, and the current loop counter value is the number of times the instruction is executed before early exit.

8. The method of claim 1, wherein modifying the execution of the portion of the code comprises executing a plurality of dummy instructions that simulates performing computations of the portion of code.

9. The method of claim 1, further comprising providing a register file in the integrated circuit configured to store configuration parameters for the side channel protection function.

10. The method of claim 1, wherein transferring execution from the program to the side channel protection function via the patch memory occurs each time the portion of code is called for execution.

11. An integrated circuit comprising:
a read only memory (ROM) configured to store a program, wherein a portion of the program has been determined to be vulnerable to a side channel attack; and
a patch memory associated with the ROM for storing one of more instructions configured to transfer execution of the program to a side channel protection function stored in the ROM, wherein the side channel protection function is configured to modify execution of the portion of firmware vulnerable to the side channel attack.

12. The integrated circuit of claim 11, further comprising a configuration storage space in the ROM for storing parameters for the side channel protection function.

13. The integrated circuit of claim 11, wherein the side channel attack is a timing attack.

14. The integrated circuit of claim 11, wherein the side channel protection function includes a delay function configured to extend an execution time of the portion of code of the program to be longer than an execution time without the delay function.

15. The integrated circuit of claim 11, wherein the portion of code is an instruction loop comprising a sequence of instructions that are repeated until a condition is met, and the side channel protection function includes a delay function that computes a delay time to be added to the instruction loop as a function of a maximum loop counter value minus a current loop counter value multiplied by a loop size in clock cycles, wherein the maximum loop counter value is a maximum number of times the loop can be executed, and the current loop counter value is the number of times the instruction is executed before early exit.

16. The integrated circuit of claim 15, wherein the maximum loop counter value, the current loop counter value, and the loop size are stored in a register file.

17. The integrated circuit of claim 11, wherein the side channel protection function modifies execution of the portion of firmware by adding a delay time to extend execution of the portion of firmware, the delay time being implemented as a plurality of instructions that simulates performing computations of the portion of code.

18. A method comprising:
executing a program stored in a read only memory (ROM) of integrated circuit, the program comprising a portion of code that is vulnerable to a side channel attack;
transferring execution of the program to a delay function that is stored in the ROM, is not part of the program, and is not called by the program;
executing the delay function comprising delaying execution completion of the portion of code by a delay time; and
returning to normal execution of the program.

19. The method of claim 18, wherein execution of the portion of code comprises determining whether a condition has been met, and when the condition is met, execution of the program proceeds past the portion of code.

20. The method of claim 19, wherein executing the delay function further comprises computing the delay time to provide an execution time of the portion of code that is independent of a number of instructions needed to be executed for the condition to be met.

* * * * *